Figure 1:
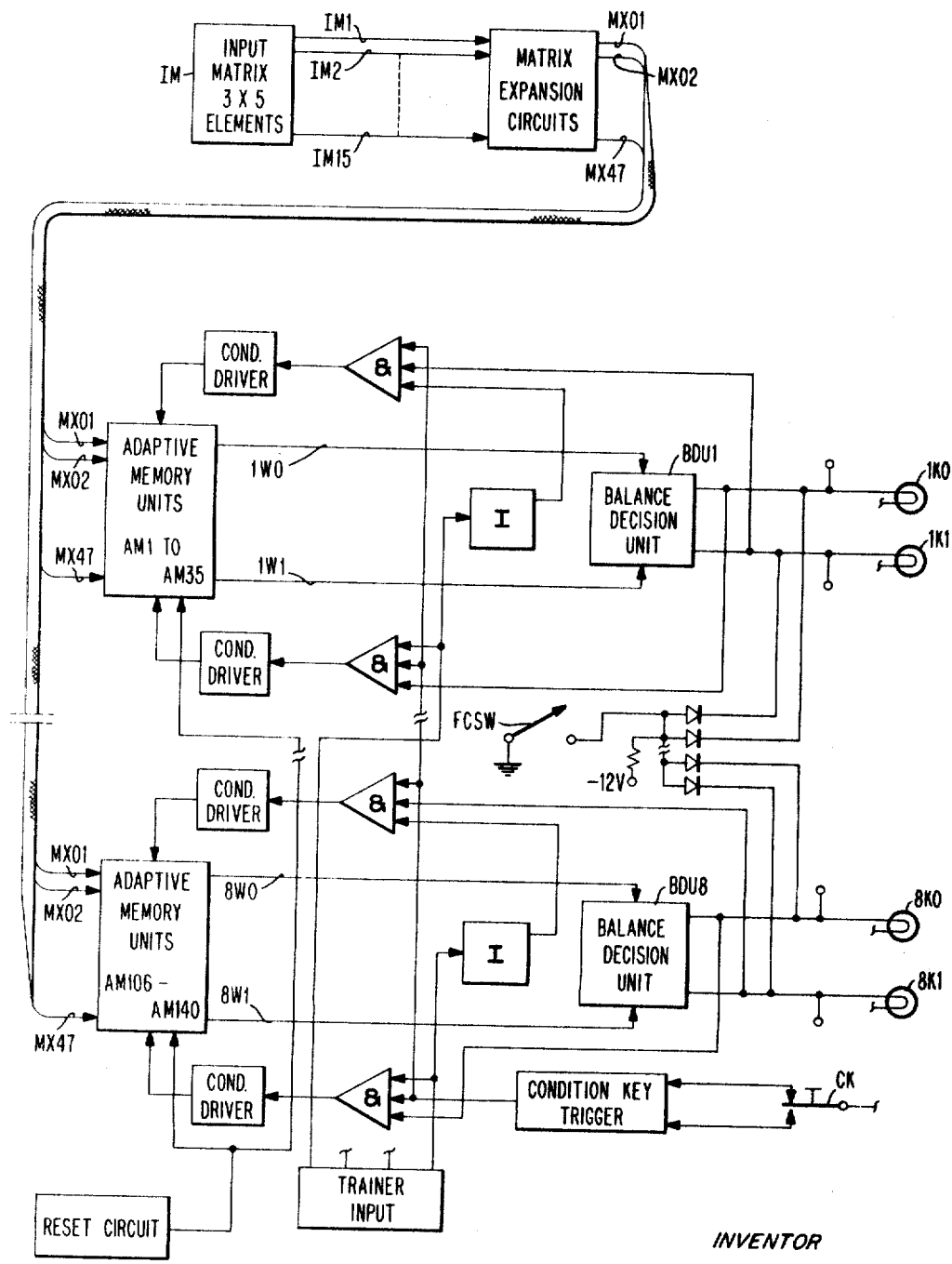

INVENTOR
GENUNG L. CLAPPER
BY Paul M. Brannen
AGENT

United States Patent Office 3,317,900
Patented May 2, 1967

3,317,900
ADAPTIVE LOGIC SYSTEM
Genung L. Clapper, Vestal, N.Y., assignor to International Business Machines Corporation, New York, N.Y., a corporation of New York
Filed Dec. 23, 1963, Ser. No. 332,528
5 Claims. (Cl. 340—172.5)

This invention relates to adaptive logic systems and particularly to an adaptive logic system in which the conditioning may be "forced" instead of allowing the conditioning to proceed in natural fashion.

Adaptive logic systems are generally constituted in such manner that a learning or training cycle is used to condition the system to respond to given inputs with desired outputs.

Initially, the system may have a null or an inchoate response, since such systems usually comprise a large number of multistate memory units, and initiation of training can find the system in a null condition or any of a number of random conditions, depending on the setting of the memory units.

During training, successive inputs are supplied to the system and the desired outputs are also supplied to the system. Suitable means detects the disparity, if any, between the input and the output and acts in the direction to correct the disparity. The inputs are again presented, and disparities between input and output are successively corrected. These training cycles, or conditioning runs, as they may be called, are repeated until the system clearly distinguishes, without error, each set of input information which is to provide a given output.

Normally, conditioning is permitted to take its natural course, by allowing the outputs of the adaptive memory units to determine whether or not the conditioning signals will influence the memory units. However, it has been discovered that the learning process may be hastened if the conditioning is forced, by rendering the output of the memory units ineffective to control the conditioning.

Accordingly, it is an object of this invention to provide an improved adaptive logic system in which the conditioning operation may be forced, rather than occurring in a natural fashion.

Another object of the invention is to provide an adaptive logic system in which the learning process is accelerated by forcing the conditioning cycle to a preselected pattern.

Still another object of this invention is to provide an improved adaptive logic system in which the normal learning process may be selectively paralyzed in such fashion as to accelerate the learning.

A further object of the invention is to provide, in an adaptive logic system using weighted outputs, means for achieving higher weight scores during the learning process.

Briefly described, the present invention contemplates an adaptive logic system in which suitable input signals are supplied to a plurality of adaptive memory units, the number being determined by the total number of inputs and the number of desired output conditions which are to be indicated. These adaptive memory units constitute metastable devices which have a null or neutral state from which they may be conditioned to one or more active states on each side or in either direction from the null or neutral condition. Such displacement or conditioning causes the adaptive memory unit to supply, on an associated set of output lines, voltages which indicate the degree to which the memory unit has been conditioned from one side or the other of its neutral state. Equal outputs indicate that the unit is in the neutral state.

All of these outputs from a bank of memory units common to a particular output condition are supplied via a pair of common output lines to a balance decision unit which is arranged and constructed in such manner that it provides a ternary output indicative of the balance of outputs on the two weighted output lines; that is, both outputs will be provided if both of the weighted output lines are equal in their weight; that is, the voltage thereon. If the output lines are not balanced, the balance decision unit will so indicate the direction of unbalance.

The outputs from the balance decision units are fed back through conditioning circuits to the adaptive memory units with appropriate reversal of connection so that departure from a given output conditions the memory unit toward that output. The present invention specifically provides means for forcing the outputs of the balance detector units to their neutral condition; i.e., with both outputs active. The conditioning of the memory units is then solely dependent upon the training or conditioning input, regardless of the outputs of the memory units.

The foregoing and other objects, features and advantages of the invention will be apparent from the following more particular description of a preferred embodiment of the invention as illustrated in the accompanying drawings.

In the drawings:

FIG. 1 is a diagrammatic view showing the entire system in simplified fashion.

Figure 2A:
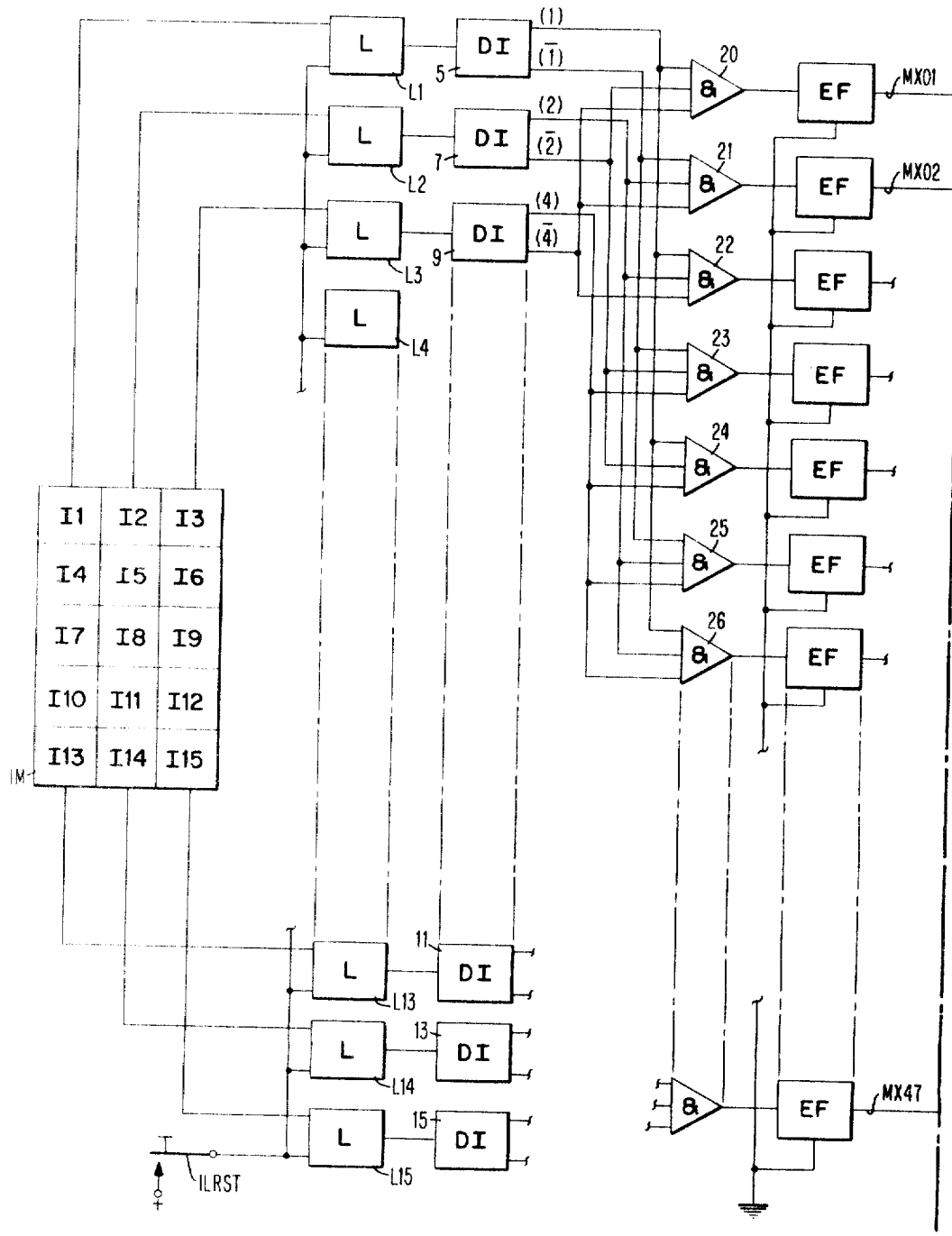
Figure 2B:
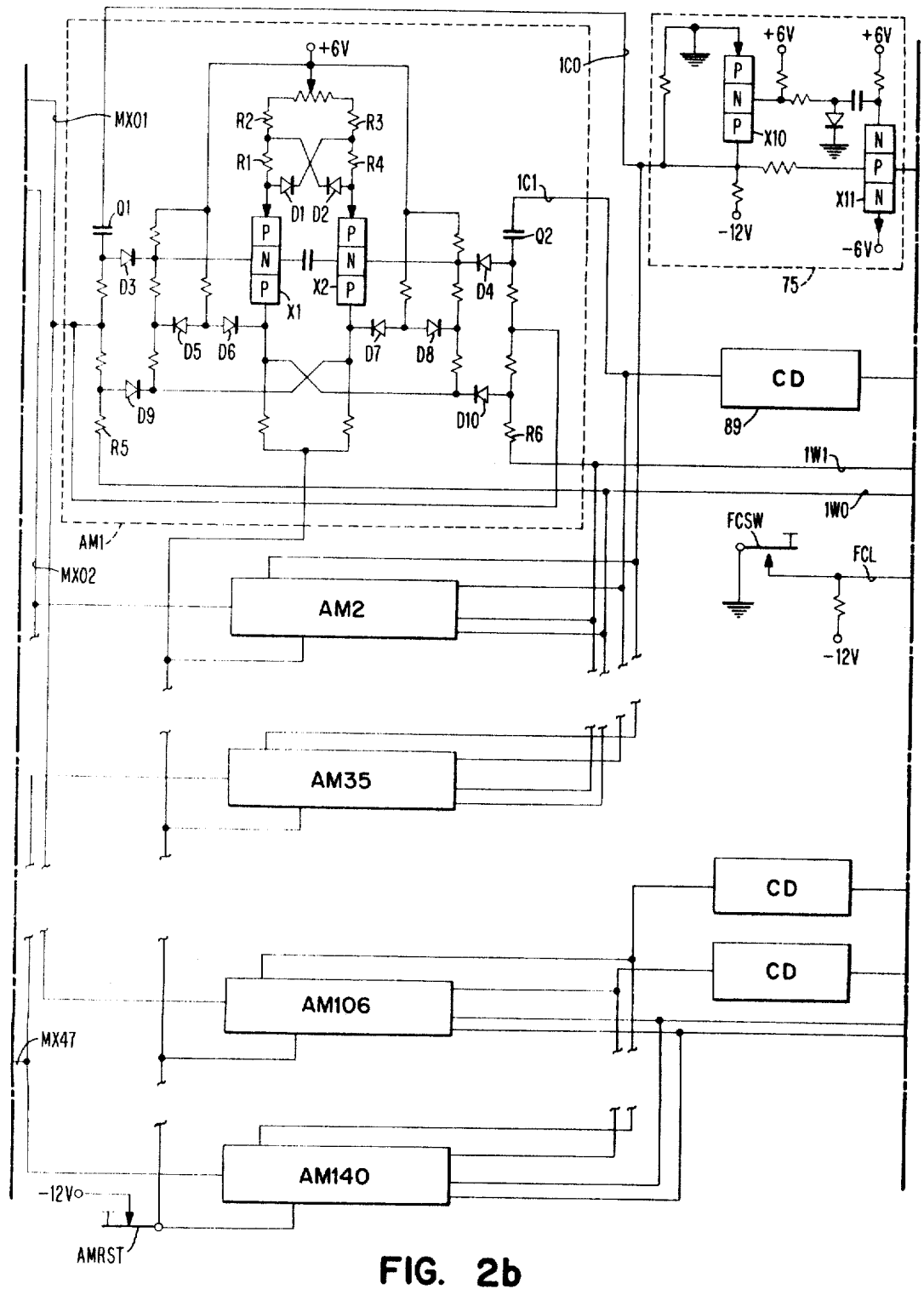
Figure 2C:
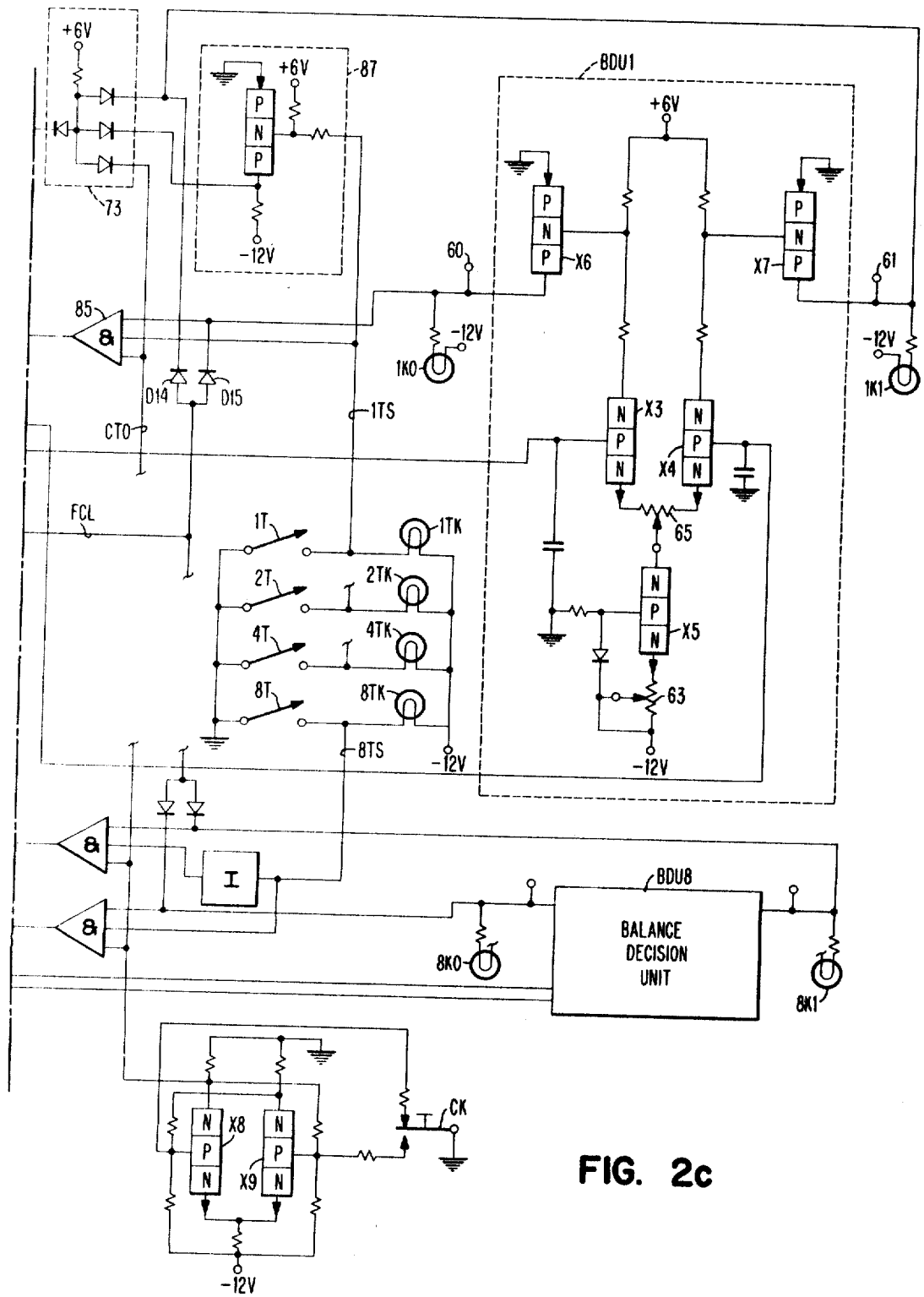

FIGS. 2a, 2b and 2c, placed side by side, in the order named, are diagrammatic views in more detail of an adaptive logic system employing a preferred embodiment of the invention.

The adaptive logic system disclosed herein to form a background for the present invention is also disclosed and claimed in a co-pending application Ser. No. 331,832, filed Dec. 19, 1963, now U.S. Patent 3,284,780, issued Nov. 8, 1966, assigned to the assignee of this application.

Referring to the general view shown in FIG. 1 of the drawings, the input to the system is derived from an input matrix IM which may have, for example, 15 elements arranged in rows of three and columns of five, from which 15 output lines, such as the lines IM1, IM2 through IM15 are supplied, these lines having signals thereon when the associated one of the elements in the input matrix is active. These input lines are connected to the matrix expansion circuits, to be later described, in which output signals are derived for the various combinations of inputs supplied thereto. These expanded or transformed outputs are designated by coded numbers, three of which are indicated as MX01, MX02 and MX47. Such outputs are supplied in parallel to a plurality of banks of adaptive memory units, only two such banks being shown in FIG. 1, the remainder being arranged in identical fashion. One such bank of adaptive memory units is provided for each output condition which is to be indicated and each of the banks contains a number of adaptive memory units equal to the number of inputs supplied thereto from the matrix expansion circuits. For example, the first bank of adaptive memory units contains adaptive memory units AM1 through AM35. The intervening two banks of adaptive memory units for the second and fourth orders of binary output are not shown, but the last bank, which would be for the binary output order of 8, will contain the adaptive memory units AM106 to AM140. As can be seen from the drawings, the inputs are supplied in parallel to each of these banks of memory units. Each memory unit in the bank is of a type which will be described in detail later, suffice it to say for the present that the memory unit, upon a supply thereto of suitable input and conditioning pulses, will provide an output on one or the other or both of a set of balanced output lines, depending upon whether or not the conditioning signals are such as to cause the memory unit to be displaced from one side or the other of a neutral condition.

The outputs from each of the adaptive memory units are supplied to a set of common output lines associated with the particular memory bank, such as the lines 1W1 and 1W0, associated with the first memory bank, and lines 8W1 and 8W0, associated with the last memory bank. The voltages on these output lines will be balanced or equal or will be unbalanced in accordance with the condition of the input-activated memory units in the memory banks to which they are connected. Thus, the condition of the adaptive memory units is reflected in the balanced or unbalanced condition of the output signal lines whenever an input pattern is presented. It will be apparent that variations in circuit parameters and environmental conditions, power supply variations and so on, will cause the outputs to vary together so that they will still maintain the same relative condition with each other, thereby eliminating many deleterious influences present in the known single threshold systems.

The outputs on the common output lines are supplied to a balance decision unit, one for each memory bank, such as the units BDU1 and BDU8. These balance decision units are sensitive voltage comparison devices, which monitor the condition of the voltage on the common output lines supplied thereto and provide output signals indicative of the balance or the unbalance of the voltages on these lines. For example, if the balance output line 1W0 has a slightly higher voltage than the line 1W1, then an output signal is supplied from the balance decision unit to the output terminal associated with the indicator lamp 1K0, indicating that the zero condition is present for the output of the first memory bank. Conversely, if line 1W1 has a higher voltage than 1W0, the indication lamp 1K1 will be lighted. In the event that the lines are balanced or nearly so, within the tolerance of the balance decision unit, outputs will be present on both outputs from the balance decision unit and, therefore, both output indicator lamps 1K0 and 1K1 will be illuminated. Additional terminals are provided as shown, which may be supplied to further units, not shown, including decoding and utilization devices for utilizing the information supplied from the adaptive memory system. Since the ultimate use of the information stored by the system is not germane to the structure and operation of the system itself, these further details have not been shown.

In order to condition the adaptive memory units, signals from a trainer input are supplied both in normal and inverted form to the adaptive memory via associated AND circuits and condition drivers as shown. In addition to the trainer inputs, the AND circuits are supplied with an input from the opposing output line of the balance decision unit as well as an input from a conditioning key trigger which serves to render the conditioning circuits active only when desired. In operation, the trainer inputs are set for the desired output with a given input and, if the balance decision unit does not put out a signal of the suitable value, the output line from the balance decision unit combines with the inputs from the trainer input and a condition key trigger and via the condition driver, which is adapted to drive all of the memory units, serves to further condition the adaptive memory units which have inputs supplied thereto to increase or decrease their weight as necessary. After the adaptive memory units have been suitably trained, it is then possible to present various input combinations thereto and have the adaptive memory units supply appropriate outputs to the output circuits that cause the desired output to be produced.

The present invention utilizes a control switch FCSW, which may be termed the forced conditioning switch, to selectively place all of the outputs of the balance decision units at the same potential, so that, effectively, the action is the same as if the balance decision units were indicating a balance on the output lines from the adaptive memory units. As shown in FIG. 1, when switch FCSW is closed, ground is connected to both output lines of each balance decision unit via decoupling diodes. Thus, the outputs of all balance decision units in the system are effectively held or paralyzed at ground potential, which is usually the potential where the associated output is active. The diodes shown are decoupling devices which normally prevent the outputs on any one line from effecting the output on another line.

Referring now to the detailed drawings, FIGS. 2a, 2b and 2c, taken together, the input to the system is considered to be derived from a plurality of input devices which may be arranged in matrix fashion designated by the reference character IM denoting input matrix. The matrix shown is a 3-by-5 matrix; i.e., three elements per row and five rows. However, it is to be understood that any number of rows and columns could be utilized. Each of the input elements is distinctively labeled as shown, I1, I2, I3, I4, etc. These elements may be, for example, photocells arranged in a matrix for detecting a pattern projected thereon. The outputs from each input element in the matrix IM; i.e., the elements I1 through I15, inclusive, are supplied as inputs to latch or trigger storage circuits indicated by the rectangles designated with the letter L and with the reference characters L1 through L15, only seven of which are shown. These latches are of conventional construction and arranged in such manner that an input thereto from the associated input element of the input matrix will cause the latch to be set ON and the latch will remain in its ON condition unless and until the input latch reset button ILRST is depressed, at which time energy is supplied to the reset circuits of all of the latches to restore them to their normal or OFF condition. The input latches L1 through L15, accordingly, serve as an input storage medium which provides input information to the subsequent circuitry. It should be noted that, if the input from the matrix is persistent, the latches can be eliminated.

Each of the input latches L1 through L15 have associated therewith a double inverter such as the ones indicated by the rectangles with the designation DI, reference characters 5, 7, 9, 11, 13 and 15, which constitute six out of the total of fifteen which would be provided in the arrangement shown. Each of the double inverters is arranged in a conventional manner to provide a normal and inverted output on the two output lines associated therewith. For example, the output lines associated with the double inverter 5 are designated by the reference characters (1) and ($\bar{1}$), indicating respectively an output line on which the value 1 is indicated and another output line in which the value of $\bar{1}$ is indicated. When no signal is supplied to the double inverter from the associated latch, the negative output line is energized and, when a signal is supplied from the latch, the positive output line is energized. Similar outputs are provided on each of the fifteen inverters. In accordance with binary coding notation, the first three inverters 5, 7 and 9 have the output lines 1, 2 and 4 and their negatives provided therefrom. This is in accordance with the binary weighting for the first row of the input matrix, and the remainder of the output lines from the double inverters would be arranged in similar fashion as illustrated by the following table:

| Input matrix—<br>Element: | Binary equivalent<br>(output of D1) |
|---|---|
| 1 | 01–$\overline{01}$ |
| 2 | 02–$\overline{02}$ |
| 3 | 04–$\overline{04}$ |
| 4 | 11–$\overline{11}$ |
| 5 | 12–$\overline{12}$ |
| 6 | 14–$\overline{14}$ |
| 7 | 21–$\overline{21}$ |
| 8 | 22–$\overline{22}$ |
| 9 | 24–$\overline{24}$ |
| 10 | 31–$\overline{31}$ |
| 11 | 32–$\overline{32}$ |
| 12 | 34–$\overline{34}$ |
| 13 | 41–$\overline{41}$ |
| 14 | 42–$\overline{42}$ |
| 15 | 44–$\overline{44}$ |

The double inverters provide outputs which are combined in a plurality of AND circuits to provide in the present case seven expanded input or transformed input signals for each three element matrix row. Since each row of the matrix is expanded in similar fashion, only the detailed arrangement for expansion of the first row will be considered. As shown, there are seven AND circuits 20 through 26 provided, each having three inputs thereto and having a single output which is energized when and only when a signal is provided at each of the three inputs to the particular AND circuit. These AND circuits are connected so that they represent all of the possible combinations of outputs from the double inverters 5, 7 and 9 except the null combination; that is, the combination which exists when all of the negative output lines of the three inverters are energized, this corresponding to a condition in which none of the inputs in the input matrix have been energized. For instance, an AND circuit 20 provides an output when there has been an input combination constituting a 1 and $\overline{2}$ and $\overline{4}$ condition for the first row, so that a prefix 0 would be used. This indicates an input to the first element of the first row but no input to the second and third element of the first row. The relationship of the remaining AND circuits in the first expansion for the first row of the input matrix are indicated in tabular form below.

| Inputs from<br>Double Inverters: | Output from<br>AND Circuit |
|---|---|
| 01–$\overline{02}$–$\overline{04}$ | MX01 |
| $\overline{01}$–02–$\overline{04}$ | MX02 |
| 01–02–$\overline{04}$ | MX03 |
| $\overline{01}$–$\overline{02}$–04 | MX04 |
| 01–$\overline{02}$–04 | MX05 |
| $\overline{01}$–02–04 | MX06 |
| 01–02–04 | MX07 |

The outputs from the AND circuits 20 through 26 are supplied through suitable emitter followers as designated by the rectangles enclosing the reference characters EF, these being provided with a suitable gating input common to all of the emitter followers and grounded as shown. Thirty-five of the emitter followers EF are provided in the system, for each of the possible matrix expansion outputs from the matrix expansion circuitry. The outputs of the emitter followers are designated by the reference character MX followed by a code designation indicating, first, the row and, second, the binary number designation on that particular line as indicated in the foregoing table. Only three examples of these outputs are shown, MX01, MX02 and MX47, which are respectively the binary one output from the zero row or topmost row of the matrix, the binary two output from the zero or topmost row of the matrix and the binary seven output from the fourth or lowermost row in the matrix, the rows being numbered consecutively 0, 1, 2, 3, 4, from top to bottom. The relationship between the outputs of all of the various elements of one row of the matrix and all of the output lines from the matrix expansion circuitry emitter followers for that row is illustrated in the following table:

| Active matrix element/s: | Transformed output |
|---|---|
| I1 | MX01 |
| I2 | MX02 |
| I3 | MX04 |
| I1, I2 | MX03 |
| I1, I3 | MX05 |
| I2, I3 | MX06 |
| I1, I2, I3 | MX07 |

A single transformed output is produced for the expansion of active elements in each row of the matrix. Thus, five out of the thirty-five output lines will be active for input patterns having elements in five rows of the input matrix.

The 35 output lines from the matrix expansion circuits are carried in multiple to each one of a plurality of banks of adaptive memory units, each bank having 35 units therein corresponding to the 35 matrix expansion lines. The number of banks is determined by the number of binary outputs by which it is desired to indicate the output conditions for a given set of input conditions supplied to the input matrix. In the present instance, it will be assumed that four banks of adaptive memory units of 35 units each will be utilized to provide binary outputs which, in binary coded fashion, namely 1, 2, 4, and 8, can supply a total output considered decimally zero to fifteen. Thus, there will be a total of 140 adaptive memory units, only one of which will be described in detail since the structure of all are similar.

As shown in FIG. 2b, the adaptive memory unit AM1 includes the apparatus shown in detail in the dotted rectangle designated AM1. These units are also disclosed and claimed in a co-pending application Ser. No. 334,397, filed Dec. 30, 1963, now U.S. Patent 3,286,103, issued Nov. 15, 1966.

Each of the memory units includes a pair of PNP transistors, such as X1 and X2, together with a plurality of diodes such as the diodes D1 through D10, and resistive and capacitive elements which, in combination, form a metastable storage device having a neutral or reset condition or state and having a plurality of settable conditions in either direction from the neutral condition or state. In the present instance, there are two stable conditions or states on either side of the neutral condition or state so that, in effect, an adaptive memory device in the present arrangements has five stable conditions or states. Each of the memory units, such as AM1, has an activating input which is supplied from the matrix expansion circuits, such as the line MX01. All other lines from the matrix expansion circuits are connected to the adaptive memory units in that particular memory bank. The input from the matrix expansion controls conditioning pulses to the 5-state trigger to move it from one state to another and also controls the application of the weighted output signals to the output lines. The diodes D3 and D4 are associated with the pair of resistor diode gates controlling the conditioning in the arrangement shown and diodes D9 and D10 are associated with the resistor diode gates controlling the summation of the weights on the output lines. The central part of the circuit is a 5-state trigger which is basically an Eccles-Jordan flip-flop modified to have three additional stable states by the use of diode pairs D1, D2; D5, D6; and D7, D8.

When power is supplied to the circuit, or following a resetting operation which is provided by operation of the reset key AMRST, the diodes D1 and D2, which are cross-connected in the emitter circuits of the transistors X1 and X2, provide a stable mode at a midpoint or a neutral state for the trigger. At this time equal collector current flows in X1 and X2 and the voltage level at the collectors is equal at some predetermined potential, say, for example, at −4 volts. The emitters of X1 and X2 are also at equal voltage levels and the emitter impedance taps are at a higher level; that is, the intermediate taps between the resistors such as R1, R2 and R3, R4. Thus, D1 and D2 are both reverse biased. The emitter impedances are therefore not connected in parallel and, since the emitter impedance is greater than the collector impedance, the effective gain of each stage, that is, either side of the trigger, is less than unity. Thus, the circuit is stable at this point and the net weight applied to the balanced output lines fom the unit will be considered to be zero since equal current flows in the resistors R5 and R6, which are connected to the common summation output lines for all of the memory units in the bank and which are designated by the reference characters 1W0 and 1W1.

A conditioning pulse on the common conditioning line for zero conditioning for the first bank, namely, 1C0, supplied along with an input on the line MX01, will cause a positive transient to be supplied to the base of transistor X1 via capacitor Q1 and diode D3. This reduces the collector current of X1 and causes the collector voltage to start dropping towards some negative value, such as −12 volts, to which the collectors are returned. At the same time the emitter of transistor X1 starts rising toward +6 volts and the diode D1 will conduct. Increased current flowing in transistor X2 causes the collector voltage to rise until it is equal to the voltage at the divider tap in the impedance from the collector of transistor X1 to the base of X2, at which time the diodes D7 and D8 will conduct equally. With both diodes D7 and D8 conducting, a low impedance inverse feedback path is established from the collector of transistor X2 to the base thereof which stabilizes the trigger at a first stable condition on one side of the neutral point, where the voltage may be, for example, −6 volts at the collector of transistor X1 and −3 volts at the collector of transistor X2 with a difference therebetween of −3 volts. This might be indicated as the −1 weight condition. This condition is indicated on the summation lines because the current flowing to the summation line 1W0 is now greater than that flowing to the 1W1 line since the collector of transistor X2 is more positive than the collector of transistor X1. Another pulse on the condition zero line for the first memory blank; namely, 1C0, still in the presence of an input signal on line MX01, would reduce the current in X1 still further. The collector of transistor X1 would drop to its lowest level, say for example −10 volts, as transistor X1 approaches cutoff and X2 approaches saturation, raising its collector voltage to some value such as −1 volt. The trigger is now stable in a second condition on one side of the neutral point which might be designated as a −2 weight and therefore the current supplied to the 1W0 line is now a maximum of −2 units.

The state of the trigger can now be changed to add increasing weight to the summation output line 1W1 by applying pulses to the condition 1 input line 1C1 at the time that a signal is present on the common input to the two sides of the trigger on line MX01. These inputs will be supplied to the base of transistor X2 via capacitor Q2 and diode D4 and the first pulse will move the trigger from the −2 weight condition to the −1 weight condition where diodes D7 and D8 would again stabilize the circuit. A second pulse on the line 1C1 will bring the trigger to its neutral state as originally described. A third pulse would bring the diode pair D5 and D6 into action and, as a result, the trigger will be set to a condition where the collector voltage for X1 will be at approximately −3 volts, whereas the collector voltage for the X2 will be at −6 volts. The difference between the voltage of the collector of X1 and the collector of X2 will be +3 volts and this may be designated as the +1 weight condition. A fourth pulse will cause the transistor X2 to approach cutoff and transistor X1 to approach saturation, which would then stabilize the trigger in a state where the collector voltage of X1 is approximately −1 and that for the collector of X2 is approximately −10, which may be considered a +2 weight for the trigger. Thus, the adaptive memory unit AM1 may be changed through its full range of five stable states and can be reversed as often as necessary by applying conditioning pulses to the appropriate line at the time that an input signal is present. Conditioning pulses are applied in common to all of the adaptive memory units in any one bank when adaptation is necessary via circuitry to be subsequently described. Only those adaptive memory units which are activated by inputs from the matrix expansion circuits will respond to such conditioning. It should be noted that the units which do not have an input signal from the matrix expansion circuits cannot change state at the time the conditioning pulses are applied nor do they affect the summation of weights on the summation output lines for their particular bank since the input lower level is below the lowest level that the collectors of the transistors in the adaptive memory unit can reach. Moreover, the units having zero weight; i.e., in their neutral state, cannot add to the net weight on the summation output lines in the presence of an input signal thereto because current flows equally into the summation output lines and, accordingly, the difference between the lines is not changed.

In order to determine the balance between the summation output lines from the individual banks of memory units, such as the balance between the lines 1W1 and 1W0, a plurality of balance decision units are provided, one for each bank of memory units. In the present instance, since there would be four banks of memory units, each associated with the binary orders 1, 2, 4, 8, in the output, there would be four balance decision units, only two of which are shown in the drawings; namely, BDU1 and BDU8. It will be understood that all of these units are similar and a detailed description of the balance decision unit BDU1 will suffice for all units in the system. The balance decision units examine the signals on the summation output lines from the memory units for balance or unbalance. When the memory is unconditioned so that all of the adaptive memory units are in their neutral state, the inputs to the decision unit will be alike and all patterns will give the intermediate or "don't know" response which could be considered a neutral state for the decision unit. The neutral state permits conditioning in either direction. After conditioning, the memory weights will sum up to give a learned response for particular input patterns and, in making a decision, no fixed threshold is used but a comparison is made between the zero and the one summation output lines; the line with the highest or most positive voltage determining the output. This determination is made by the balance decision unit comprising a sensitive voltage discriminator device which includes a pair of emitter-coupled transistors X3 and X4 with a transistor X5 acting as a constant current source to increase the sensitivity of the arrangement.

First, consider the case where no input pattern is present in the matrix so that the summation output voltages are the same. At this time transistors X6 and X7, which are connected in the collector circuits of X3 and X4, will conduct by virtue of the equal current distribution between the transistors X3 and X4. X5, acting as a constant current device, limits the current to a particular value, say for example, 3 milliamperes. This current divides equally between transistors X3 and X4 so that each conducts one half of the total; i.e., 1.5 milliamperes. With suitable circuit parameters then, a smaller current flows in the base circuits of the transistors X6 and X7 to bring these to saturation. Thus, in this present instance, an equality of the inputs to the decision unit is effective to energize both of the outputs. The outputs of the balance decision unit may be supplied to a suitable output terminal such as 60 and 61, and the outputs may also be indicated by suitable output indicator lamps such as the lamps 1K0 and 1K1, shown in the drawings, both of which would be lighted at this time since transistors X6 and X7 are both conducting.

A relatively small difference in the potential between the two summation lines 1W1 and 1W0, such as 0.05 volt, will cause the current to be unequally distributed between the transistors X3 and X4. If under these circumstances the input voltage on 1W0 is greater or more positive than 1W1, transistor X3 will conduct almost all of the current which in turn will hold ON transistor X6; but transistor X7 will be turned OFF as the voltage at the base of this transistor rises towards +6 volts. Conversely, if the voltage on the summation output line 1W1 is more positive than that on 1W0, transistors X4 and X7 conduct to provide a "1" output and turn OFF the "0" output. The adjustable voltage divider 63 in the emitter circuit of transistor X5 provides an adjustment to regulate the amount of sensitivity to which the balance detector unit will respond. Also, an adjustable resistor 65 is provided to center the null point within the insensitive zone. In a memory bank of 35 units, the minimum difference for one unit of weight may be arranged to be some relatively low voltage such as 0.1 volt, for example, and the insensitive zone may be 0.05 volt on either side of the null point.

The conditioning of the adaptive memory units is accomplished by operation of a conditioning key which in turn controls a conditioning trigger, the output of the conditioning trigger being fed along with information from the balance decision units and a training switch input to appropriate logic circuits from whence a signal is supplied to a condition driver circuit which in turn supplies conditioning pulses to each of the adaptive memory units in the particular memory bank. Since all of the circuitry is similar, only one set of conditioning circuits will be described and it will be understood that the remainder are arranged in similar fashion. The conditioning key or switch CK is a spring loaded key which, in its normal condition, causes a conditioning trigger comprising two transistors X8 and X9 to assume one of its two stable states. When the conditioning key is operated, the trigger is switched to its other state and provides an output pulse, returning to its initial state when the key is released. The conditioning key trigger is conventional in construction, constituting a pair of NPN transistors X8 and X9 which are emitter coupled, and which have the biases changed thereon in accordance with the operation of the conditioning key CK. Suitable cross-coupling circuits are provided to insure that the one half of the trigger is turned off while the other is turned on and so forth. The output from the conditioning trigger is supplied to a common conditioning trigger output line CT0, which is supplied to a plurality of AND logic circuits associated with each memory bank. One such logic circuit is shown at 73 and constitutes a plurality of diodes connected to a load resistor and to a suitable source of energy in conventional fashion, so that inputs must be present at each of the three gating diodes in order to provide an output therefrom. The output from the AND circuit 73 is supplied to a conditioning driver indicated by the dotted rectangle 75 and comprising a pair of transistors X10 and X11, connected in such manner that an input pulse supplied from the AND circuit 73 will cause the conditioning driver to provide an output pulse on the conditioning line, such as 1C0 connected thereto. Sufficient power is provided by this driver to drive all of the adaptive memory units in the bank, in this particular instance 35. An R-C timing circuit from the collector of transistor X11 to the base of transistor X10 controls the duration of the output pulse so that a pulse of constant width is produced independent of the duration of the input pulse from the AND circuit 73.

The training of this system is under the control of a plurality of training switches, one for each bank, which are designated in binary code fashion by the reference characters 1T, 2T, 4T and 8T. These switches, when closed, establish a circuit from −12 volts to ground through an associated indication lamp such as lamps 1TK, 2TK, 4TK and 8TK. With the switch open, the training signal lines such as 1TS connected to the switch have a negative potential supplied thereto through the lamp. When the switch is closed, the lamp is lighted and the potential on the line goes to ground. This difference in potential is supplied directly to one of the AND circuits, such as 85, and is supplied to the other AND circuits, such as 73, via an inverter, as 87. The inverter comprises a PNP transistor connected in such manner that the input and output signals are inverted. The remaining input to the AND circuits in the conditioning portion of the system, such as the AND circuits 73 and 85 for the first bank, are supplied from the outputs of the balance decision unit associated with that particular bank; for example, the output signals from BDU1 are supplied to one of the inputs to AND circuit 85 and the output from BDU1 at terminal 61 is also supplied to one of the inputs of AND circuit 73. It will be noted that the output from the balance decision unit indicating the "1" condition is fed back to the adaptive memory unit to influence the zero condition weighting while the output from the "0" condition for the balance decision unit 1 is fed back via AND circuit 85 and a conditioning driver 89 to the conditioning line 1C1 which weights the adaptive memory unit AM1 in a positive direction. Similar conditioning circuits with suitable inputs from the associated balance decision units and from the training switches are provided for each of the other banks in the system.

In adapting a system to distinguish different combinations of inputs, a particular combination of inputs is entered into the memory by appropriately energizing selected elements of the input matrix which, via matrix expansion circuits, are entered into the adaptive memory with the desired output combination set up on the training switches. The conditioning key is then operated and those memory units which indicate an output other than that desired are automatically conditioned by the signals supplied from the balance decision unit and the training switches via the AND circuits and conditioning drivers to shift the particular input-activated adaptive memory unit or units in the proper direction. A second set of inputs is then supplied to the input matrix and the process is repeated with the training switches being set to provide the selected output for the second set of inputs. After a first run of such training operations, it will be found necessary of course to return and recondition the adaptive memories, since they will shift back and forth during the memory process, and several runs through the learning process will be required before the system will adapt to a particular set of inputs with a particular set of outputs.

The forced conditioning is provided, as previously described, by causing the outputs of all the balance decision units to be paralyzed in their neutral state, that is, both outputs on. To this effect, closing switch FCSW applies ground potential, which is the ON condition at the outputs of all decision units, to a forced condition control line FCL, which is normally at a −12 volt potential. A pair of diodes, such as D14, D15, connect the line FCL to the outputs of the decision units. Although only the connections for banks 1 and 8 are shown, banks 2 and 4 would be similarly connected. Thus, with FCSW closed, the decision making portion of each memory bank is paralyzed, and the adaptive units are now "forced" to respond to input and conditioning pulses irrespective of the achievement of particular states which would normally be reflected by the balance decision units.

This action is utilized only at the beginning of a learning cycle, and thereafter the "forced" conditioning is removed, allowing conditioning to proceed in normal fashion. It can be shown that the initial forced conditioning can cause an acceleration of the learning process and the accumulation of higher weight scores, the forced conditioning being similar to "rote" learning in the case of human learning.

From the foregoing, it will be apparent that the present invention provides an improved arrangement for decreasing the learning time in adaptive logic systems by initially paralyzing or nullifying the decision-making portion of the system so that learning during this interval is on a priori basis, with the result that the system adapts faster and accumulates higher weight scores in the process.

While the invention has been particularly shown and described with reference to a preferred embodiment thereof, it will be understood by those skilled in the art that various changes in form and details may be made therein without departing from the spirit and scope of this invention.

What is claimed is:

1. An adaptive logic system comprising, in combination,
   a plurality of adaptive memory units, each unit capable of being conditioned to selected ones of a plurality of stable states in accordance with input and conditioning signals supplied thereto,
   input signal means for supplying input signals to said memory units,
   conditioning signal means for supplying conditioning signals to said memory units,
   conditioning control means connected to the output of said adaptive memory units for governing said conditioning signal means in accordance with the outputs of said adaptive memory units, and
   means for selectively inhibiting said conditioning control means for preventing the governing of said conditioning signal means by said conditioning control means 2. An adaptive logic system comprising, in combination,
   a plurality of metastable adaptive memory units,
   input signal means for supplying input signals to said memory units,
   conditioning means connected to said memory units to condition the units to predetermined conditions in accordance with said input signals and in accordance with desired outputs,
   conditioning control means connected to said memory units and to said conditioning means to control the conditioning of said memory units in accordance with the outputs therefrom, and
   means for selectively disabling said conditioning control means whereby the state of said memory units is not reflected in the conditioning of said units.

3. An adaptive logic system comprising, in combination,
   a plurality of metastable memory units each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
   input means connected to said memory units for setting said units in selected conditions;
   a pair of memory output signal lines connected to the output circuits of all of said memory units;
   balance decision means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;
   conditioning means for controlling the conditioning of said memory units to selected conditions in response to input signals, said conditioning means being controlled by said balance decision means to condition said memory units in a direction to displace said units from the condition indicated by said balance detection unit; and
   means for selectively inhibiting the control of said conditioning means by said balance decision means to cause said conditioning means to respond only to said input signals.

4. An adaptive logic system comprising, in combination,
   a plurality of metastable memory units each unit having a plurality of stable conditions on each side of a neutral condition, each said memory unit having two output circuits, the output signals on said circuits being balanced when said memory unit is in its neutral condition and unbalanced in one direction or the other when said unit is displaced to one side or the other of said neutral condition;
   input means connected to said memory units for setting said units in selected conditions;
   a pair of memory output signal lines connected to the output circuits of all of said memory units;
   balance decision means connected to said output signal lines and responsive to signals on said lines to provide a first output when the signals on said memory output lines are equal, a second output when the signals on said memory output lines are unbalanced in a first relation, and a third output when the signals on said memory output lines are unbalanced in a second relation;
   conditioning means for controlling the conditioning of said memory units to selected conditions in response to input signals, said conditioning means being controlled by said balance decision means to condition said memory units in a direction to displace said units from the condition indicated by said balance detection unit;
   training means settable to selected conditions representing desired outputs, said training means governing said conditioning means to render said conditioning means responsive to govern said memory units when a variance exists between the desired output as selected by said training means and the actual output of said memory units as indicated by said balance detecting means; and
   forced conditioning means for selectively disabling the control of said conditioning means by said balance decision units so that the output of said memory units is not effective in controlling their conditioning.

5. An adaptive logic system as claimed in claim 4, in which said forced conditioning means comprises means for establishing simultaneous signals on both output lines from said balance decision unit, irrespective of the output signals from said balance decision unit.

References Cited by the Examiner

UNITED STATES PATENTS

| 3,022,005 | 2/1962  | Dickinson     | 235—152   |
|-----------|---------|---------------|-----------|
| 3,097,349 | 7/1963  | Putzrath et al. | 340—172.5 |
| 3,103,648 | 9/1963  | Hartmanis     | 340—172.5 |
| 3,158,840 | 11/1964 | Baskin        | 340—172.5 |

FOREIGN PATENTS 1,307,396  9/1962  France.

OTHER REFERENCES

Pages 212–217, 1959—A Self-Organizing Binary System, Richard Mattson, Proceedings of the Eastern Joint Computer Conference.

ROBERT C. BAILEY, *Primary Examiner.*

I. S. KAVRUKOV, *Assistant Examiner.*